(12) United States Patent
Salamon

(10) Patent No.: US 12,314,429 B2
(45) Date of Patent: May 27, 2025

(54) COMPUTING CLUSTER-WIDE SHREDDING SYSTEM AND METHOD OF USING THE SAME

(71) Applicant: Dell Products, L.P., Round Rock, TX (US)

(72) Inventor: Victor Salamon, Edmonton (CA)

(73) Assignee: Dell Products, L.P., Round Rock, TX (US)

( * ) Notice: Subject to any disclaimer, the term of this patent is extended or adjusted under 35 U.S.C. 154(b) by 393 days.

(21) Appl. No.: 17/813,353

(22) Filed: Jul. 19, 2022

(65) Prior Publication Data

US 2024/0028760 A1 Jan. 25, 2024

(51) Int. Cl.
*G06F 21/62* (2013.01)

(52) U.S. Cl.
CPC ................ *G06F 21/6245* (2013.01)

(58) Field of Classification Search
CPC ...... G06F 21/6245; G06F 2221/2143
See application file for complete search history.

(56) References Cited

U.S. PATENT DOCUMENTS

| | | | | |
|---|---|---|---|---|
| 2007/0105445 A1* | 5/2007 | Manto | ................. | H05K 9/0084 |
| | | | | 439/620.09 |
| 2008/0141382 A1* | 6/2008 | Jonas | .................... | G06F 21/88 |
| | | | | 726/34 |
| 2017/0161527 A1* | 6/2017 | Urda | .................... | G06F 21/87 |
| 2021/0229632 A1* | 7/2021 | Cai | .................... | G07C 9/00571 |

* cited by examiner

*Primary Examiner* — Abiy Getachew
(74) *Attorney, Agent, or Firm* — Fogarty LLP

(57) ABSTRACT

According to one embodiment, a computing cluster-wide shredding system includes a shredding device configured to shred multiple computing components of a computing cluster, such as a data center. The shredding device operates under control of a shredding controller. The shredding controller includes executable instructions that receives a trigger signal requesting that the computing cluster be shredded, and controls the shredding device to shred the computing cluster.

20 Claims, 6 Drawing Sheets

COMPUTING CLUSTER-WIDE SHREDDING SYSTEM AND METHOD OF USING THE SAME

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Racks provide a means for densely housing relatively large numbers of individual computing devices. Administration of such large groups of IHSs may require teams of remote and local administrators working in shifts in order to support around-the-clock availability of the data center operations while minimizing any downtime.

Advancements in networking have enabled the rise in pools of configurable computing resources commonly referred to as computing clusters. A computing cluster may be formed from a physical infrastructure including physical resources, such as may be found in large data centers. The physical infrastructure can include a number of resources having processors, memory, storage, networking, power, cooling, and the like. System management consoles (e.g., OpenManage Enterprise) of these data centers can aggregate a selection of the resources to form servers and/or computing hosts. These hosts can subsequently be allocated to execute and/or host system software, such as Operating Systems (OSs), Virtual Machines (VMs), applications, or the like. The amount of data storage in data centers continues to increase, often at exponential levels, thus requiring larger physical storage resources in currently deployed data centers.

SUMMARY

According to one embodiment, a computing cluster-wide shredding system includes a shredding device configured to shred multiple computing components of a computing cluster, such as a data center. The shredding device operates under control of a shredding controller. The shredding controller includes executable instructions that receives a trigger signal requesting that the computing cluster be shredded, and controls the shredding device to shred the computing cluster.

According to another embodiment, a computing cluster-wide shredding method includes the steps of receiving a trigger signal requesting that a computing cluster be shredded, and controlling a shredding device to shred the computing cluster. The computing cluster comprises multiple computing components According to yet another embodiment, a computing cluster-wide shredding system includes a computing cluster with multiple computing components, a shredding device to shred the computing cluster, and a controller. The controller has computer-executable instructions to receive a trigger signal requesting that the computing cluster be shredded, and control the shredding device to shred the computing cluster.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Figure 1:
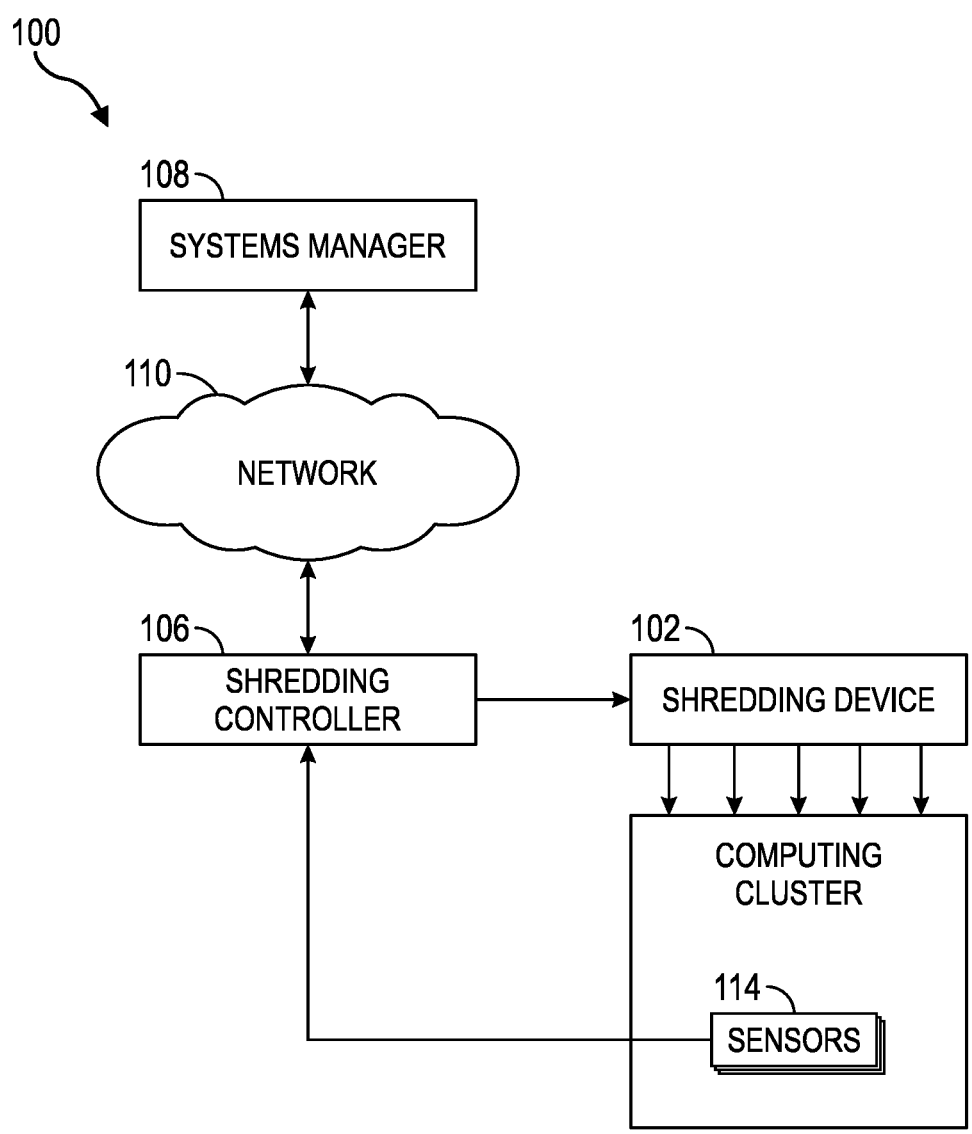
FIG. 1 is a block diagram of an example cluster-wide shredding system according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

As described previously, groups of IHSs may be housed within data center environments. A data center typically refers to a number of computing racks that are disposed within a single location, such as a building. Systems management appliances, such as the OpenManage Enterprise systems manager Dell® have been developed to interact with the components (e.g., cooling units, power distribution units (PDUs), etc.) of the computing racks in data centers. These Systems management appliances can also make inferences of impact, based on inventory information it stores. With liquid cooling being considered for more than just CPUs, other components (e.g., GPUs, DIMMs, etc.) have increased the need for detection, inferencing, and immediate reactive control. In general, organizing IHSs within data centers has recently become commonplace due to the cost efficiencies provided by IHS administration that maintains the operation of the IHSs for multiple tenants who may lease a certain portion of the IHSs for their own use.

Due to current security requirements, customer data may need to be securely erased or deleted in such a way as to be unrecoverable (known as data shredding). Shredding confidential/sensitive data on a persistent media is critical for the protection of data for business and agencies. One example of shredding involves overwriting the areas of the physical media on which the customer data is stored. Overwriting typically replaces the data with one of a variety of bit patterns, such as all 0's, all 1's, and the like. Another type of shredding involves physical destruction of the computing components that may possess important data.

Shredding may be initiated manually by a user, such as the author or owner of the data. However, other situations exist when it would be beneficial for the shredding to be performed automatically in response to a triggering event, as a means of data security. For example, a data center's physical security is breached by a malicious actor. Thus, the data center is now running under the control of the malicious actor. Although certain computing components, such as Virtual Machines (VMs), data images stored on hard drives, and the like may be encrypted (e.g., access to its contents are locked with authentication), for high value data assets in the data center, the attacker can use advanced, high-performance computing resources (e.g., supercomputers, distributed computing, emerging technologies such as quantum computing, etc.) to breach the locked data in a relatively short amount of time.

Once the secure access to a data center is breached by, for example, cutting off the data center owner's network access, a number of disadvantages may be incurred. For one reason, lack of network access severely hampers the ability of the data center owner from initiating the shredding the of the data center or its contents, and/or to protect access to its confidential contents. For another reason, current solutions involving security and data shredding may apply separately to different components of the data center, specifically those components which have built-in self-shredding technologies. For example, some hard drives in a data center may be self-shredding while others are not. One particular example of a self-shredding hard drive is a Solid State Drive product line provided by AUTOTHYSIS that will self-destroy the internals upon receipt of a specific text message (e.g., SMS messaging). Another example self-shredding hard drive may be an INVINCIBLE product line type of hard drive provide by RUNCORE. To use these specific solutions, however, the entire data center's storage systems would have to be retrofitted with these specific drives, a relatively costly and disruptive endeavor for existing data centers due to the self-shredding hard drive's cost and labor involved.

Software-based shredding solutions exist, some encryption-based, some shredding-based). Examples include a self-shredding, secure VM, Storage and Application Stack, a self-destruction model for protecting data in cloud storage based on data storage center, and a project which attempts to protect copies and/or backups of Vanishing Data Objects with limited lifecycles. However, these software-based solutions may become vulnerable to emerging attack technologies (ex. quantum computing, supercomputers) and other newly found vulnerabilities that are discovered at an ongoing basis.

Another disadvantage of conventional shredding techniques is that there exists no physical self-shredding solutions for SSDs, flash memories and other non-volatile data storage. Additionally, there exists no physical self-shredding solutions (similar to above) for compute nodes (e.g., VMs, appliances, bare-bone machines, etc.) or network nodes (switches, routers, packet analyzers, etc.). Both these types of nodes can carry information "in processing" that can be of high value to attackers.

Yet another disadvantage is that no solutions exist for rack mounted nodes for storage devices (e.g., HDD, SSD, etc.). Even if there were some self-shredding solutions, such as for a relatively small subset of the elements of a data center, there are currently no self-shredding solutions which simultaneously shred the data on all types of data center components, which may include compute devices, storage devices, as well as networking devices.

FIG. 1 is a block diagram of an example cluster-wide shredding system 100 according to one embodiment of the present disclosure that may provide a solution to the aforedescribed problems, among others, with conventional shredding mechanisms. The system 100 generally includes a shredding device 102 configured to shred (e.g., destroy, render unusable for its intended purpose, etc.) a computing cluster 104. The shredding device 102 is controlled by a shredding controller 106 such that, it receives a trigger signal requesting that the computing cluster be shredded, and controls the shredding device 102 to shred the computing cluster 104.

The computing cluster 104 may be any type of computing system that is configured with multiple computing devices. Examples of such a computing cluster 104 may comprise a data center, a computing rack, a network switch, a storage array, a blade array, a converged infrastructure, and the like. It may be important to note that computing components other than storage devices may also be considered to be useful to be shredded by embodiments of the present disclosure because they often store, at least temporarily, important secure data that could otherwise be stolen.

The shredding controller 106 may include a memory (e.g., random access memory (RAM), read-only memory (ROM), and/or other types of non-volatile memory) for storing executable instructions that may be executed on one or more processing resources such as a central processing unit (CPU) for performing the various features described herein. In one embodiment, the shredding controller 106 may be, or form a part of, an HIS 200 as described below with respect to FIG. 2.

The shredding controller 106 may be controlled by a systems manager 108 that communicates with the shredding controller 106 through a network 110. In one embodiment, the systems manager 108 also controls the operation of the computing cluster 104. Nevertheless, it should be appreciated that the systems manager 108 may communicate locally with the shredding controller 106 and/or the computing cluster 104, or form a part of the computing cluster 104. In general, the systems manager 108 is configured to monitor and control the shredding controller 106 and/or any number of computing components (e.g., IHSs 200) in the computing cluster 104. In one embodiment, systems manager 108 includes at least a portion of the Dell EMC OpenManage Enterprise (OME) that is installed on a secure virtual machine (VM), such as a VMWARE Workstation.

The shredding controller 106 receives trigger signals from one or more sensors 114 that monitor certain aspects of the computing cluster 104, and processes the trigger signals to determine whether or not the computing cluster 104 should be shredded. While the sensors 114 are shown as being housed within the computing cluster 104, it should be appreciated that the sensors 114 may be configured external to the computing cluster 104. For example, the shredding controller 106 may receive signals from external sources, such as one or more external sensors or a heartbeat generator. The shredding controller 106 responds to trigger signals from sources other than the sensors in order to determine whether or not the computing cluster 104 should be shredded. For example, the shredding controller 106 may monitor a digital combination door lock, and when too many unrecognized physical access Personal Identification Number (PIN) attempts, are detected, trigger the shredding controller 106 to shred the computing cluster 104. As another example, the shredding controller 106 may be responsive to instructions from the systems manager 108 to shred the computing cluster 104. For example, an IT administrator who is remotely monitoring the computing cluster 104 via the systems manager 108 and possesses specific knowledge that an attack on the computing cluster 104 is currently occurring or is about to occur, may provide user input to the systems manager 108 for instructing the shredding controller 106 to shred the computing cluster 104.

In one embodiment, a sensor 114 may include a presence detector (e.g., motion sensor, heat sensor, etc.) indicating that a malicious individual is inside a restricted area, outside of allowed hours, and/or without authentication to be in the restricted area. Another example sensor 114 may include a vibration sensor that detects motion indicating that certain important components of the computing cluster 104 are where they are not supposed to be. If the computing cluster 104 is a mobile computing cluster), the motion sensor, vibration sensor, and/or a GPS detector may be used by the shredding controller 106 to determine that the mobile computing cluster 104 is being moved when it is not supposed to be. Another type of sensor 114 may include a presence detector that measures a heartbeat and breath rate to determine that the computing cluster 104 should be shredded. Other types of sensors may be used to detect that the computing cluster 104 is being illicitly accessed.

In one embodiment, the shredding controller 106 may serve the role of a watchdog. That is, the shredding controller 106 may be responsive to the lack of a signal or message stream to trigger actuation of the shredding device 102. For example, ceasing to get a once-a-minute message stream (e.g., heartbeat message) from the systems manager 108 may trigger the shredding controller 106 to actuate the shredding device 102.

In one embodiment, the shredding controller 106 may be controlled by the systems manager 108 to set one or more policies for how the shredding controller 106 determines that the trigger signals indicate an actual illicit access event. For example, the systems manager 108 may control the shredding controller 106 with one or more threshold values such that when one or a combination of these threshold values are exceeded, determine that the computing cluster 104 should be shredded.

In one embodiment, the shredding controller 106 and shredding device 102 may be disposed locally at, within, or in close proximity to the computing cluster 104 in a secure, hard to get to location. Thus, the determination of whether the computing cluster 104 should be shredded is performed locally. Embodiment of the present disclosure may provide a benefit in that, because the determination of whether the computing cluster 104 should be shredded is performed locally, malicious actors are not capable of inhibiting the proper operation of the cluster-wide shredding system 100 by performing actions, such as shutting down communications with external networks (e.g., network 110) that would otherwise limit the ability of the shredding device 102 to be directly controlled by the systems manager 108.

Some, most, or all actions and triggering policies may be turned on by default and can be independently deactivated via the systems manager 108. To protect this security from an intruder changing the actions or triggers, these settings can be deactivated only when no triggering conditions, such as described above are currently being detected. In one embodiment, to prevent damage due to false triggers, the triggering conditions described above can be overridden with a supervisory authentication procedure (even remotely) within a saving grace period. That is, the shredding controller 106 may, upon determining that the computing cluster 104 should be shredded, generate an alert message to the systems manager 108 that the computing cluster 104 will be shredded in a specified period of time (e.g., 60 seconds) if no supervisory overriding authentication procedure is performed.

Embodiments of the present disclosure may provide certain benefits over conventional shredding mechanisms. For one reason, the protection/self-shredded actions can be triggered automatically, without a human initiating these actions, even in the presence of an attack on the network that provide communications with the computing cluster 104 (e.g., to cut off remote access). For another reason, no need exists to retrofit existing computing clusters 104 with self-shredding drives, thus alleviating expense and downtime. For yet another reasons, as it is a physical protection technique and functions out-of-band with respect to the other management network, it is immune to future software vulnerabilities and attack vectors. For yet another reason, the cluster-wide shredding system 100 is configured to shred many types of computing cluster components including compute nodes (machines, virtual and bare-bones), storage nodes, and network nodes (switches, routers, packet analyzers), which are not covered by existing physical auto-shredding solutions. For yet another reason, the cluster-wide shredding system 100 is configured to shred many types of storage devices (hard disk drives, solid-state drives, flash memories, etc.) that are not covered by existing physical auto-shredding solutions. Additional detail of the cluster-wide shredding system 100 will be described in detail herein below.

Figure 2:
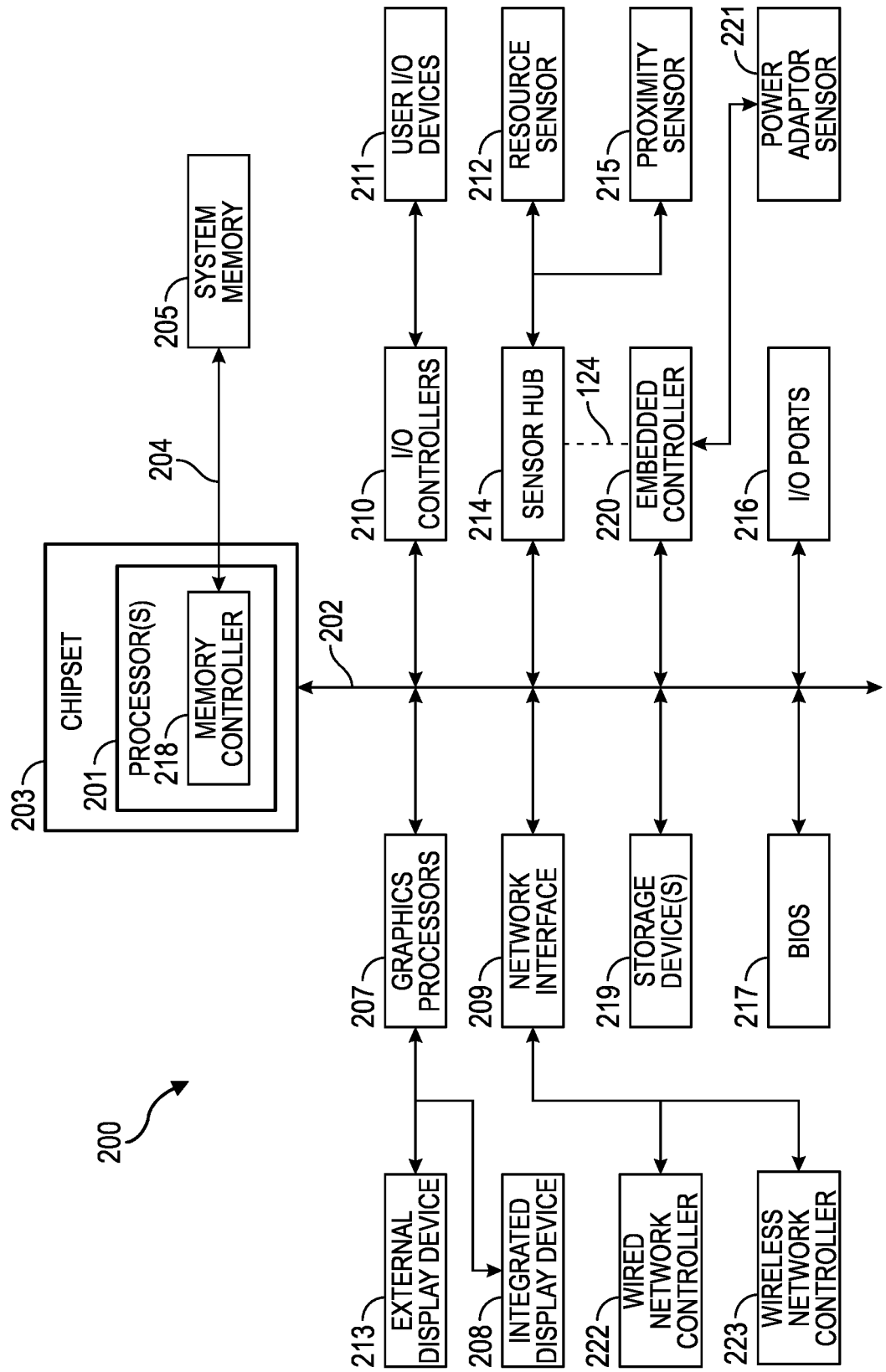
FIG. 2 is a block diagram illustrating various resources of an example IHS that may be embodied in whole, or in part, as the shredding controller, the systems manager, and/or the computing components of the computer cluster of FIG. 1.

FIG. 2 is a block diagram illustrating various resources of an example IHS 200 that may be embodied in whole, or in part, as the shredding controller 106, the systems manager 108, and/or the computing components of the computing cluster 104 of FIG. 1. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with diverse types of external devices and systems, including removable couplings with peripheral devices that may be configured for operation by a particular user of IHS 200. For instance, I/O ports 216 may include USB (Universal Serial Bus) ports, by which a variety of external devices may be coupled to IHS 200. In addition to or instead of USB ports, I/O ports 216 may include several types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support several types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support diverse types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit (I²C) bus or other suitable type of bus connection.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 124.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3A:
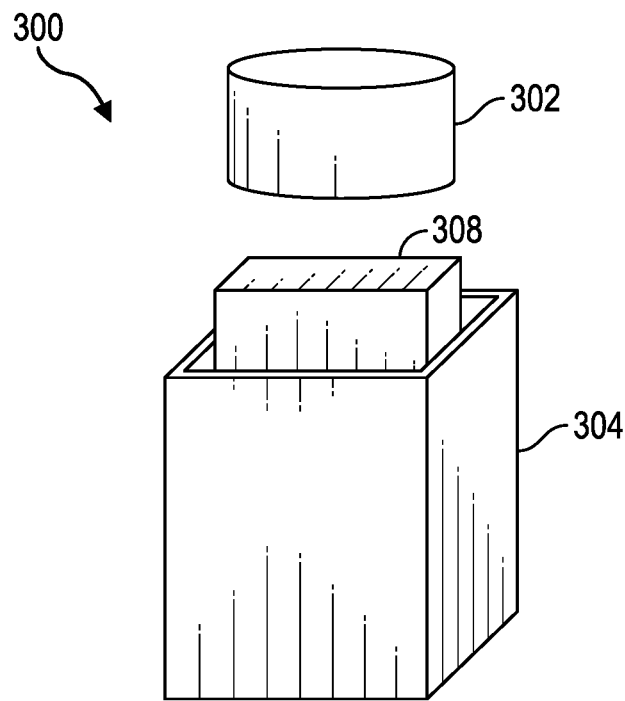
FIGS. 3A-5 illustrate example shredding devices that may be used by the cluster-wide shredding system according to one embodiment of the present disclosure.
Figure 3B:
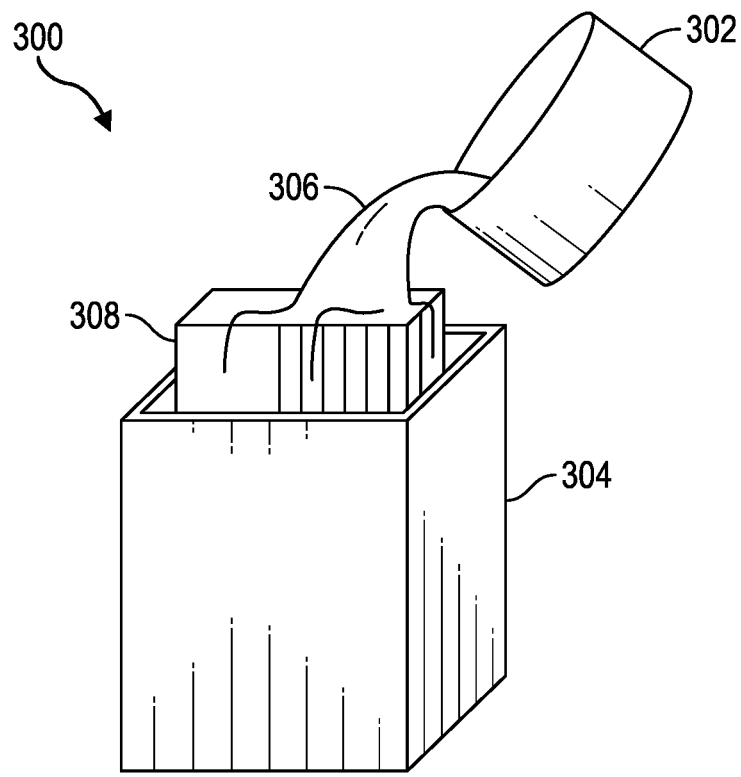
Figure 4:
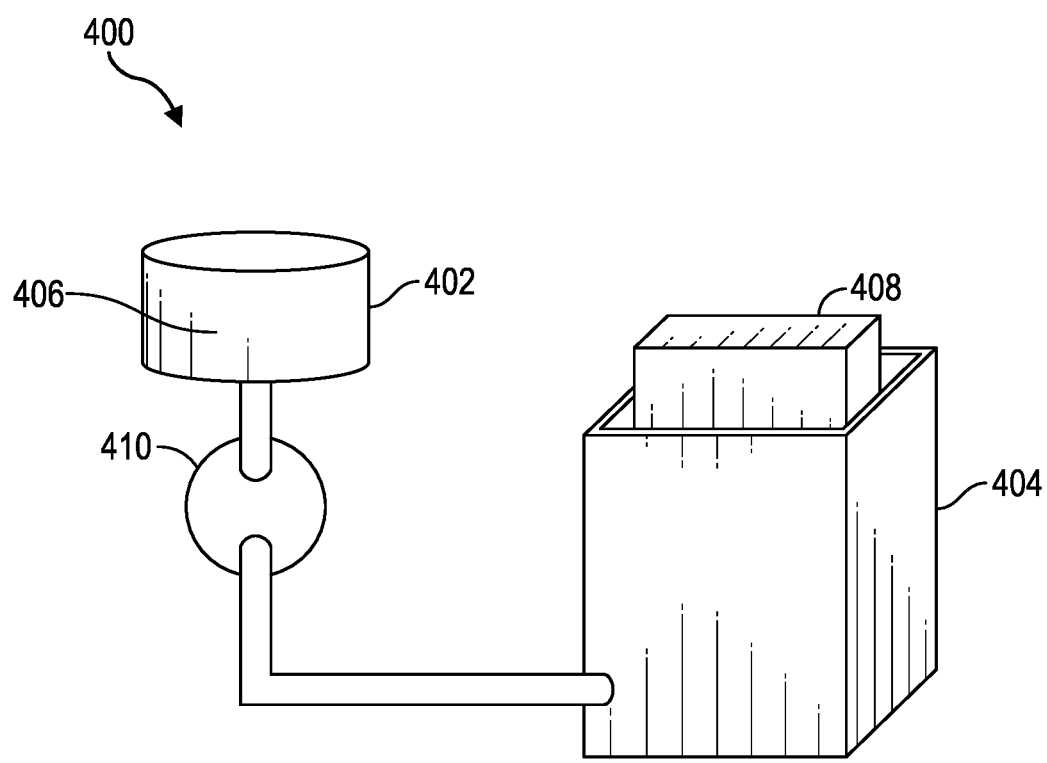
Figure 5:
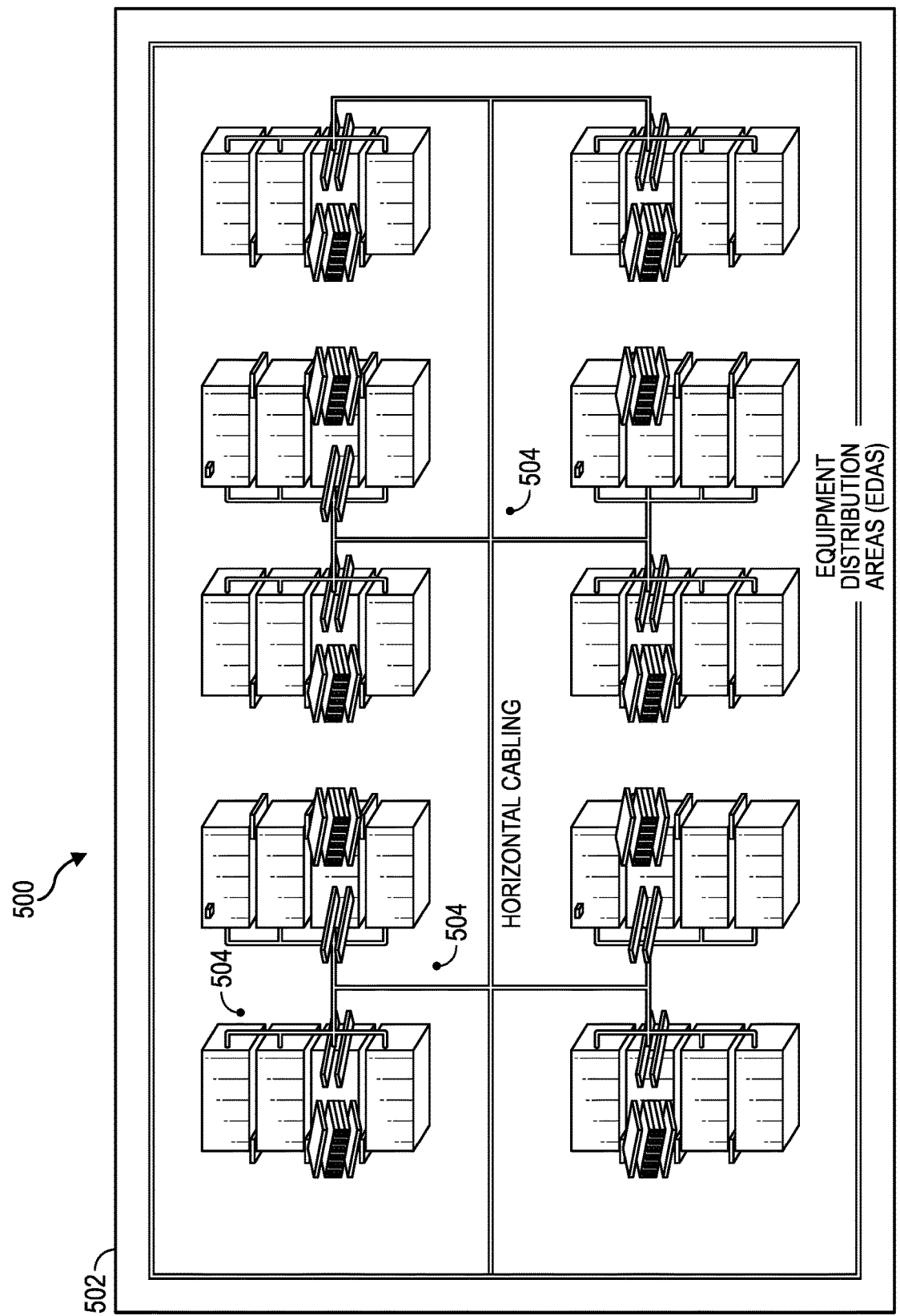

FIGS. 3A-5 illustrate example shredding devices that may be used by the cluster-wide shredding system 100 according to one embodiment of the present disclosure. In particular, FIGS. 3A and 3B illustrates an example corrosive substance shredding device 300, FIG. 4 illustrates an example expanding polymer shredding device 400, while FIG. 5 illustrates an example electro-magnetic pulse (EMP) shredding device 500. Each of these shredding devices 300, 400, and 500 may be controlled by the shredding controller 106 to shred or otherwise destroy multiple components of the computing cluster 104.

Referring initially to FIGS. 3A and 3B, a corrosive substance shredding device 300 is shown having a corrosive substance vat 302 and a cluster component container 304. The cluster component container 304 is configured to contain one or more components 308 of the computing cluster 104. For example, the components 308 may form at least a part of a computing rack that houses certain components of the computing cluster 104 as described herein above. The corrosive substance vat 302 is configured to contain a corrosive substance 306 such as a pourable material (e.g., liquid, gel, etc.) that will not damage or destroy the corrosive substance vat 302, but is corrosive (e.g., destructive) to the components 308 via a chemical reaction. Examples, of such corrosive substances 306 may include, for example, a strong acid (e.g., sulfuric acid, muriatic acid, hydrochloric acid, etc.), a strong base (e.g., magnesium hydroxide, calcium hydroxide, potassium hydroxide, etc.), or an oxidizer (e.g. hydrogen peroxide).

As best shown in FIG. 3B, when the corrosive substance 306 is poured over the components 308, the corrosive properties of the corrosive substance 306 shreds or otherwise destroys the components 308. Rotation of the corrosive substance vat 302 may be performed by a servo motor, linear actuator, or other electro-mechanical device under control of the shredding controller 106. In another embodiment, the corrosive substance vat 302 may be in fluid communication with a valve (not shown) such that, when the valve is opened under control of the shredding controller 106, the corrosive substance 306 may be introduced into the container 304 for shredding the components 308.

Referring now to FIG. 4 an expanding polymer shredding device 400 is shown. The expanding polymer shredding device 400 generally includes an expanding polymer vat 402 and a cluster component container 404. The cluster component container 404 is configured to contain one or more components 408 of the computing cluster 104 in a manner at least somewhat similar to the corrosive substance container 304 of FIGS. 3A and 3B. The expanding polymer vat 402 is configured to contain an expansive polymer 406 that expands and cures when introduced into the container 404. The expansive polymer 406 may be a 1-part material that expands as it cures due to contact with air or optionally, may comprise a multi-par (e.g., 2-part) material in which two separated substances are mixed while they are being introduced into the container 404. The expansive polymer 406 may be introduced into the container 404 in any suitable manner. For example, the expansive polymer 406 may be introduced using a pump 410. In other embodiments, the expansive polymer 406 may be introduced into the container 404 with a valve (not shown) in which the expanding polymer vat 402 is disposed at a higher elevation than the container 404.

The expansive polymer 406 provides its shredding effect by expanding as it cures to permanently damage the components 408. Additionally, when the expansive polymer cures the components 408 are encased inside of a relatively hard cured material such that access to the components 408 may be inhibited.

Referring now to FIG. 5, an electro-magnetic (EMP) shredding device 500 is shown. The EMP shredding device 500 generally includes one or more EMP devices 504 configured in a data center 502. The EMP devices 504 are strategically placed in the data center 502 to target the various components that may carry information of value to an attacker. The EMP devices function under control of the shredding controller 106 to generate a large EMP pulse that shreds the components configured inside the data center 502. In some embodiments, a single EMP device 504 may be used. In general, an electric pulse can be generated through a mechanical motion triggered by potential energy (ex. a magnetic barrel moved by a loaded coil or a controlled gunpowder burn).

Certain embodiments of the system 100 that use EMP devices 504 may provide certain advantages. For example, the EMP devices 504 may be relatively safe for humans while in storage as well as when they are used for their intended purpose. The EMP devices 504 may shred most, or all types of computing equipment in the data center 502, including, for example, solid state drives (SSDs), firmware devices (e.g., SoCs), volatile and non-volatile memory, and the like. Additionally, EMP devices 504 do not depend on an electrical source to be detonated. Thus, the EMP device 504 may be used when electrical power to the data center 502 is lost. The EMP device 504 can be installed with little or no disruption to the everyday operation of the data center 502.

Figure 6:
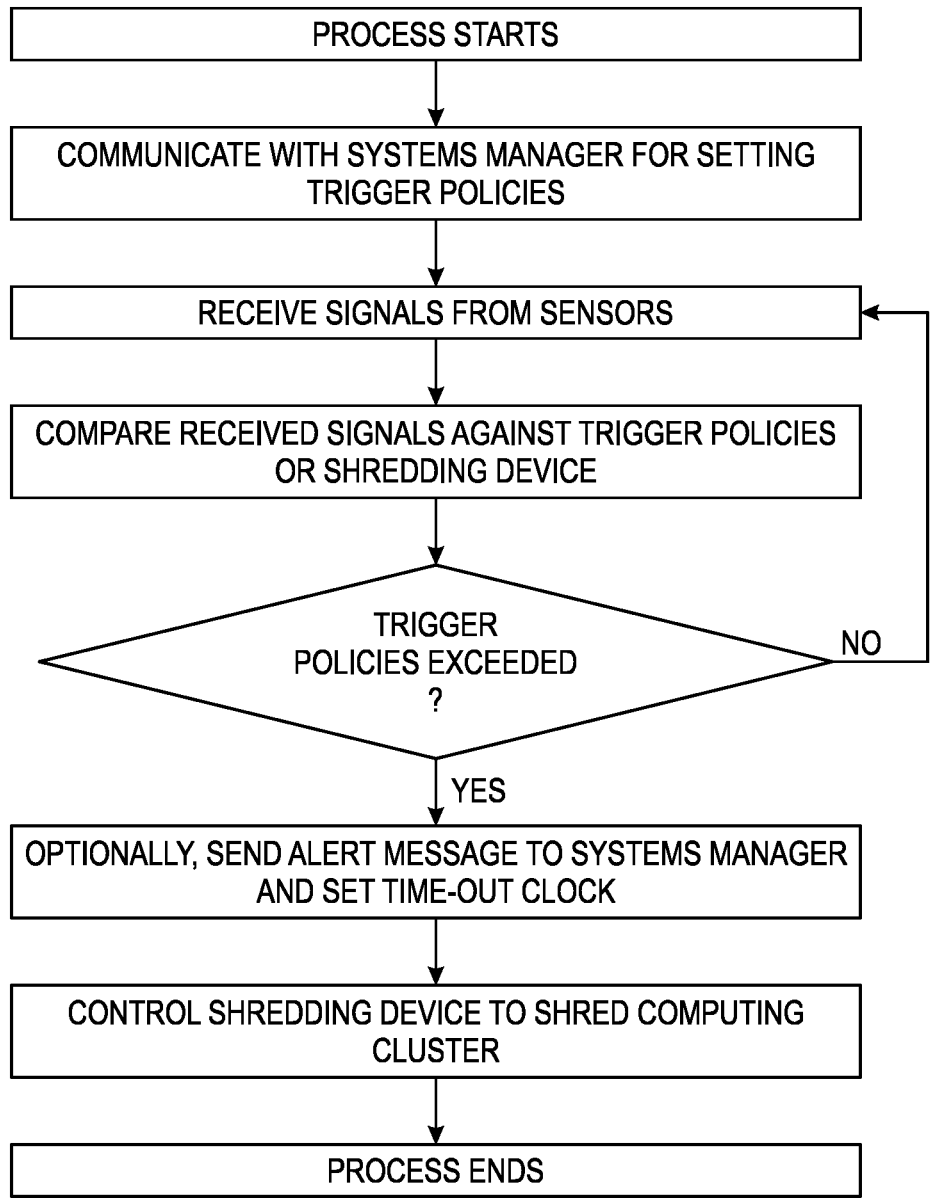
FIG. 6 illustrates an example cluster-wide shredding method that may be performed to shred multiple components in a computing cluster according to one embodiment of the present disclosure.

FIG. 6 illustrates an example cluster-wide shredding method 600 that may be performed to shred multiple components in a computing cluster according to one embodiment of the present disclosure. Certain steps of the method 600 may be performed, at least in part by the shredding controller 106 of FIG. 1. Initially, a computing cluster (e.g. data center) may be configured with a shredding device 102 and a shredding controller 106. At step 602, the method 600 begins.

At step 604, the method 600 communicates with the systems manager 108 for setting one or more trigger policies. For example, a user at the systems manager 108 may initiate a login session with the shredding controller 106 to set certain policies associated with how the shredding controller 106 is triggered. One policy that may be set includes, for example, a certain quantity of humans that are detected inside of the building housing the computing cluster 104 when no people or a fewer number of people than the quantity detected are currently authorized to be there. Another policy may be how long they are detected inside of the building. Yet another policy may be a weighting policy to be applied for various times of the day (e.g., nighttime, morning, afternoon, evening, etc.). Other policies may exist.

At step 606, the method 600 receives signals from sensors and other sources of information. The other sources of information may include, for example, a memory of the systems manager 108 that stores information about authorized personnel who are currently authorized to be at the data center, or a digital combination door lock that has detected a failed PIN number entry, a computing component of the computing cluster 104 with an executing process that detects illicit activity, and the like. Another source of information may be, for example, an external witness. At step 608, the method 600 compares the received signals against the trigger policies for the shredding device. If any triggering policies are exceeded at step 610, processing continues at step 612; otherwise, processing continues at step 606 for continual monitoring of the computing cluster 104. Within the present disclosure the phrase "receiving a trigger signal" may be taken to mean an active receipt of a signal and/or the lack of a previously ongoing signal or message stream (e.g., heartbeat message).

At step 612, the method 600 optionally sends an alert message to the systems manager 108 and sets a time-out clock. That is, the method 600 may generate a warning to authorized personnel (e.g., IT administrator) that security for the computing cluster 104 has been breached and the computing cluster 104 will be shredded within a certain specified period (e.g., 60 seconds) if no manual intervention is performed. Nevertheless, step 612 does not have to be performed if not needed or desired.

At step 614, the method 600 shreds the computing cluster 104. The computing cluster 104 may be shredded using any shredding device 102, such as a corrosive substance shredding device 300, an expanding polymer shredding device 400, and/or a EMP shredding device 500 as described above with reference to FIGS. 3A-5. At this point, the computing cluster has been shredded and the process ends.

Although FIG. 6 describes one example of a method that may be performed for shredding a computing cluster, the features of the disclosed process may be embodied in other specific forms without deviating from the spirit and scope of the present disclosure. For example, the method 600 may perform additional, fewer, or different operations than those operations as described in the present example. For example, the method 600 may perform the steps in a sequence other than that described above. As yet another example, certain steps of the aforedescribed process may be performed by the systems manager 108, the shredding controller 106, an IHS configured in the computing or some combination thereof.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A computing cluster-wide shredding system comprising:
   a shredding device to shred a plurality of computing components of a computing cluster; and
   a controller comprising at least one processor and at least one memory coupled to the at least one processor, the at least one memory having program instructions stored thereon that, upon execution by the at least one processor, cause the controller to:

receive a trigger signal from a sensor in a restricted area external to the computing cluster;

determine if the computing cluster should be shredded, based at least in part on the trigger signal; and in response to determining the computing cluster should be shredded, control the shredding device to shred the computing cluster.

2. The computing cluster-wide shredding system of claim 1, wherein the shredding device comprises an electro-magnetic pulse (EMP) device.

3. The computing cluster-wide shredding system of claim 2, wherein the EMP device comprises a plurality of EMP devices.

4. The computing cluster-wide shredding system of claim 1, wherein the shredding device comprises a corrosive substance.

5. The computing cluster-wide shredding system of claim 4, wherein the corrosive substance comprises at least one of an acid, a base, or an oxidizer.

6. The computing cluster-wide shredding system of claim 1, wherein the shredding device comprises an expansive polymer.

7. The computing cluster-wide shredding system of claim 1, wherein the controller is further executed to determine that the computing cluster is to be shredded according to one or more trigger policies.

8. The computing cluster-wide shredding system of claim 7, wherein the controller is further executed to receive the one or more trigger policies from a remotely configured systems manager.

9. The computing cluster-wide shredding system of claim 1, wherein the computing cluster comprises a data center.

10. A computing cluster-wide shredding method comprising:

receiving a trigger signal from a sensor external to a computing cluster, wherein the trigger signal comprises a periodic heartbeat message stream, and wherein the computing cluster comprises a plurality of computing components;

in response to detecting a ceasing of the periodic heartbeat message stream, determining if the computing cluster should be shredded, based at least in part on detecting the ceasing of the periodic heartbeat message stream; and in response to determining the computing cluster should be shredded, controlling a shredding device to shred the computing cluster.

11. The computing cluster-wide shredding method of claim 10, further comprising determining that the computing cluster is to be shredded according to one or more trigger policies.

12. The computing cluster-wide shredding method of claim 11, further comprising receiving the one or more trigger policies from a remotely configured systems manager.

13. The computing cluster-wide shredding method of claim 10, wherein the shredding device comprises at least one of a corrosive substance, an acid, a base, an oxidizer, or an expansive polymer.

14. A computing cluster-wide shredding system comprising:

a computing cluster comprising a plurality of computing components;

a shredding device to shred the computing cluster; and a controller comprising at least one processor and at least one memory coupled to the at least one processor, the at least one memory having program instructions stored thereon that, upon execution by the at least one processor, cause the controller to:

receive a trigger signal from a sensor external to the computing cluster, the sensor comprising a human presence detector, the trigger signal comprising an indication at least one individual is present in a restricted area;

in response to receiving the trigger signal, determine if the computing cluster should be shredded, based at least in part on the indication at least one individual is present in the restricted area and a policy received from a manager system, wherein the policy defines when people are authorized to be in the restricted area; and in response to determining the computing cluster should be shredded, control the shredding device to shred the computing cluster.

15. The computing cluster-wide shredding system of claim 14, wherein the shredding device comprises an electro-magnetic pulse (EMP) device.

16. The computing cluster-wide shredding system of claim 14, wherein the shredding device comprises a corrosive substance.

17. The computing cluster-wide shredding system of claim 14, wherein the shredding device comprises an expansive polymer.

18. The computing cluster-wide shredding system of claim 14, wherein the controller is further executed to determine that the computing cluster is to be shredded according to one or more trigger policies.

19. The computing cluster-wide shredding system of claim 18, wherein the controller is further executed to receive the one or more trigger policies from a remotely configured systems manager.

20. The computing cluster-wide shredding system of claim 14, wherein the computing cluster comprises a data center.

* * * * *